Figure 1:
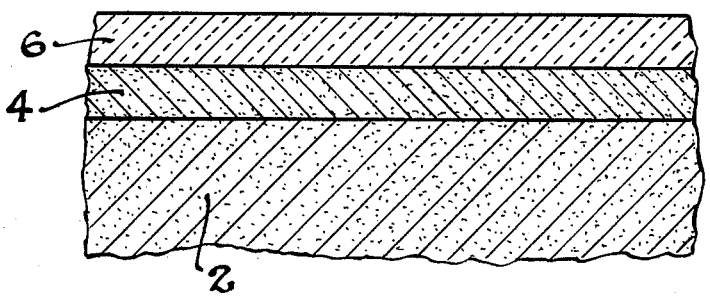

May 3, 1966 R. J. GERRY 3,249,460
PROTECTED REFRACTORY ARTICLES
Filed March 7, 1961

Inventor
Ronald J. Gerry
By Allan R. Redrow
Attorney

United States Patent Office 3,249,460
Patented May 3, 1966

3,249,460
PROTECTED REFRACTORY ARTICLES
Ronald J. Gerry, Chippawa, Ontario, Canada, assignor to Norton Company, Worcester, Mass., a corporation of Massachusetts
Filed Mar. 7, 1961, Ser. No. 93,923
8 Claims. (Cl. 117—70)

This invention relates to protected refractory articles and, more particularly, to graphite articles which are impervious to corrosive gases and which have a low capture cross-section for thermal neutrons. It also relates to process for the production of such articles and compositions for use in such processes.

Graphite is a very useful construction material, particularly because it has such great resistance to high temperatures and can withstand sudden changes in temperature. As a result, it is widely employed in the construction of equipment used in the chemical and other industries. Since graphite also possesses a low capture cross-section for thermal neutrons, it has become an important structural material in design and production of nuclear reactors.

Although graphite does possess a number of very attractive properties, it has some weakness, outstanding of which is a comparatively low resistance to oxidation, especially at elevated temperatures. This adverse property tends to limit the usefulness of graphite in a number of possible applications, e.g., in carbon dioxide cooled nuclear reactors that are operated at temperatures above 800° F. As such temperatures, carbon dioxide atmospheres are corrosive to graphite because a reaction occurs between the solid graphite and the gaseous carbon dioxide to produce a fluffy form of carbon that is entrained by the heated gases and eventually plugs the passages through which they flow.

The usefulness of graphite as a material of construction for nuclear reactors or other process equipment would be substantially improved by the modification of graphite structures to make them resistant to the corrosive effect of carbon dioxide at elevated temperatures or other gaseous atmospheres which are normally corrosive to graphite. One method which suggests itself for obtaining such protection of graphite, of course, is the coating of the graphite with some material which would be impervious to the corrosive atmosphere, but at the same time, would not be destroyed or detrimentally affected under the prevailing conditions. Obviously, if the graphite is to be used in the formation of components of nuclear reactors, such a protective coating should not adversely affect the low capture cross-section for thermal neutrons of the final structure.

The formation of mechanically stable and impervious coatings on graphite structures is quite difficult. This comes about because commercial graphite bodies are quite anisotropic, with a coefficient of thermal expansion which varies with direction. However, it has been known for some time that it is possible to apply a mechanically stable coating of silicon carbide on graphite, and such an operation is described in U.S. Patent 2,677,627. This coating exists as a closely adherent, finely crystalline layer of silicon carbide which has good resistance to mechanical erosion, is very hard, is resistant to thermal shock, and is nearly as refractory as the underlying graphite. The silicon carbide coating is not appreciably attacked by oxidizing gases and yet graphite structures coated with silicon carbide is this fashion do not resist the corrosive effect of carbon dioxide at the temperatures encountered in nuclear reactors. It appears that the failure of the silicon carbide layer to protect the underlying graphite against the destructive gases is due to sufficient porosity in the carbide layer to allow the gases to penetrate the layer and undergo the undesirable reactions with the underlying graphite which results in the corrosive effect.

A principal object of this invention is to provide an improved refractory structure composed of a main body portion formed of graphite which is protected against deterioration by fluids normally corrosive to graphite by an impervious corrosion resistant coating that is mechanically stable and securely anchored to the graphite base. Further objects include:

(1) The provision of new methods for forming protected graphite articles having a low capture cross-section for thermal neutrons, while being resistant to deterioration by atmospheres that are normally corrosive to unprotected graphite.

(2) The provision of new coating compositions which comprise a special mixture of frits which have the property of wetting silicon carbide without being completely absorbed, which match the thermal expansion of silicon carbide sufficiently well to avoid excessive thermal stresses when applied as a coating over silicon carbide and which can produce a fused layer which is impervious to gases and resistant to oxidation or other types of corrosion when maintained in atmospheres that are normally corrosive to graphite.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished according to the present invention by forming a refractory article having a low capture cross-section for thermal neutrons with a main body portion or base composed of graphite, a coating consisting essentially of silicon carbide covering an outer surface of the graphite base and an impervious protective glaze covering the silicon carbide coating, this glaze consisting essentially of a fused mixture of zinc oxide, aluminum oxide, lead oxide and silica. Preferably, the fused mixture comprising the protective glaze will be formed of 6–10% by weight of zinc oxide, 2–6% of aluminum oxide, 25–30% silica and 55–65% lead oxide.

The new corrosion-resistant refractory articles in this invention are formed by a procedure which basically includes providing a base of the general size and shape of the final article composed of graphite, applying a thin layer of silicon carbide to the outer surface of the graphite base which is to be exposed to a corrosive atmosphere, applying a frit which will provide a fused layer as indicated above over the silicon carbide coating and then firing the resulting structure to fuse the frit and produce a protective glaze enclosing the graphite base and the superimposed silicon carbide layer. Preferably, the protective glaze is formed from a mixture of two separate frits, each having different compositions as more fully described below, these two frits being blended in such proportion that when the mixture is fused, its absorption will be properly controlled to conform to the porosity of the silicon carbide layer surrounding the graphite base so that the protective glaze will sufficiently wet the silicon carbide layer without being completely absorbed by it. Furthermore, it is preferable to flash-fire the final structure in producing the porcelain glaze, rather than slow firing, which would require a neutral or reducing atmosphere to protect the graphite base from oxidation before the protective glaze has matured sufficiently to protect it.

The success of the present invention is due to a large extent to the discovery that a glaze material consisting essentially of zinc oxide, aluminum oxide, lead oxide and silica, possesses a critical degree of adherence and resistance to spalling to form a fluid-impermeable coating over silicon carbide which, in turn, may be used as an inner layer to anchor the protective glaze to a graphite base to create a refractory article which is resistant to mechanical erosion, chemical corrosion and completely resistant to any thermal and mechanical shock that might be encountered by the refractory article during its use.

As previously indicated, it has been known to coat graphite with a closely adherent, finely crystalline layer of silicon carbide, such a process being described in U.S. 2,667,627. As a matter of fact, the preferred method for forming the silicon carbide layer which constitutes an essential portion of the new refractory articles in this invention, is the procedure as described in this patent. Furthermore, it has been previously known to apply a glaze over a silicon carbide coating which has been superimposed upon a carbon or graphite base, e.g., see U.S. 1,948,382. The surface glaze which is provided according to this latter patent is based upon fluorides of alkali and alkaline earth metals. As such, the resulting carbon article is not resistant to deteriorating effects of certain corrosive atmospheres and would not have the low thermal neutron absorption cross-section possessed by the protected refractory articles of this present invention.

A more complete understanding of the new products and processes of this invention may be had by reference to the accompanying drawing, in which:

FIG. 1 is a diagrammatical, fragmentary, sectional view of a surface section of a refractory article in accordance with this invention. In the figure, the article consists of a graphite base or body 2, a silicon carbide layer 4, and a top protective glaze 6.

Figure 2:
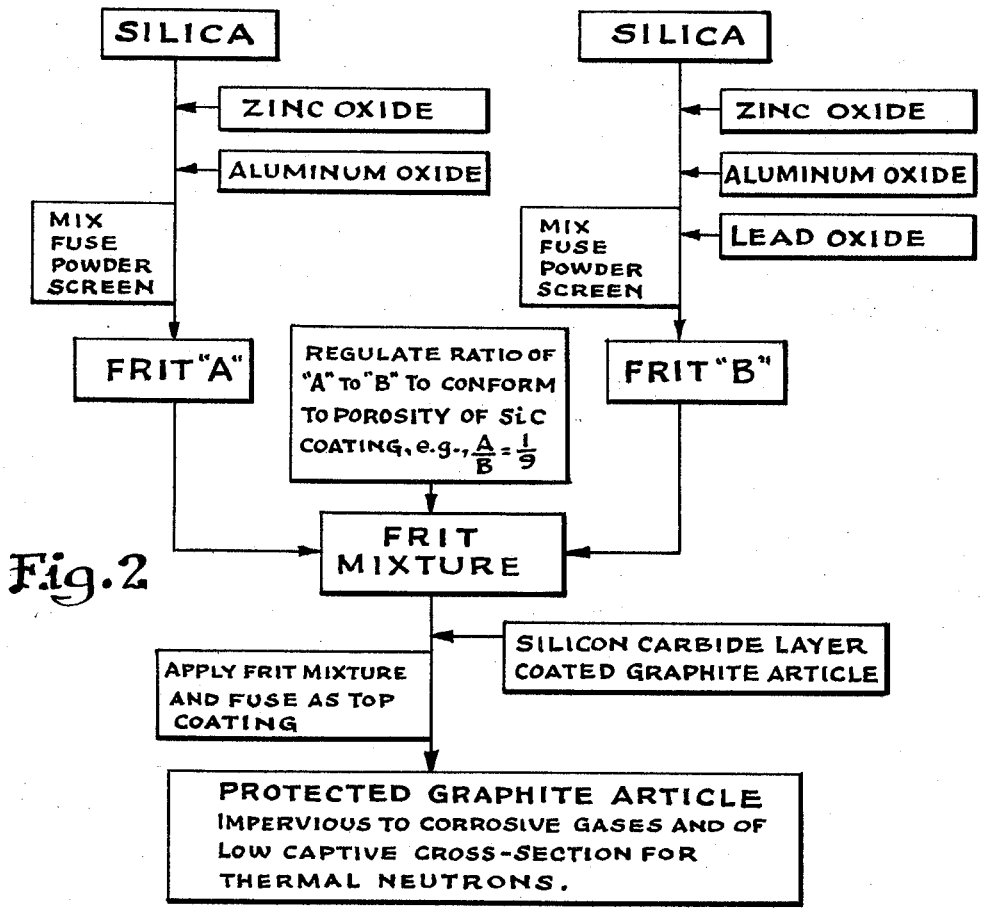

FIG. 2 is a flow sheet of the type suggested by M. O. Wolk, 30 J.P.O.S. 368, illustrating the major operations and materials involved in the new procedures for production of protected refractory articles in accordance with the invention. It should be understood by the reader that because of space limitations, the flow sheet cannot indicate all the details of the new procedures and, for these, reference should be made to the following detailed discussion of the invention.

EXAMPLE

The following example of operations in accordance with this invention is given by way of introduction to the description of details which follows. In this example, all parts and percentages are by weight unless otherwise specified.

A hollow graphite cylinder three inches in outside diameter and three inches long, with a wall ⅜ inch thick, was given a uniform coating of silicon carbide 0.010 to 0.015 inch thick by the process described in U.S. Patent 2,677,627, Two batches of frit were made up by meltnig the constituents together in a silicon carbide crucible at a temperature of about 1600° C. and pouring the molten material into water. The compositions of the two batches are shown in Table I.

Table I

| Frit A | | Frit B | |
| --- | --- | --- | --- |
| Component | Parts | Component | Parts |
| ZnO | 44.7 | ZnO | 3.7 |
| Al$_2$O$_3$ | 12.7 | Pb$_3$O$_4$ | 66.5 |
| SiO$_2$ | 42.6 | Al$_2$O$_3$ | 3.4 |
| | | SiO$_2$ | 26.4 |

The batches of frits A and B were each ball-milled dry in a porcelain mill with flint pebbles for about two hours. The powdered frits were then passed through a silk screen having an average opening of about 0.003 inch. The small amount of oversize was recycled to the next batch of each correspondent frit.

A slurry or slip was made by mixing one part of frit A with nine parts of frit B and adding enough water to produce a creamy suspension. The slurry was then spread evenly on the SiC surface of the coated graphite cylinder to a depth sufficient to produce a uniform white surface with no SiC showing through. This coating was allowed to dry in the air, producing a friable chalky white surface.

The glaze was flash fired by placing the body in a muffle furnace at 1250° C. and removing it after six minutes. The resulting body was covered with a uniform glaze that adhered strongly to the underlying SiC coating.

To determine how well the glaze protected the graphite, three graphite cylinders were heated in CO$_2$ to 800° C. One of the cylinders was untreated, another was coated with SiC as in the first stage of the foregoing process and the third was coated with SiC and then glazed as described above. They incurred weight losses from oxidation as follows:

Table II

OXIDATION TEST ON REFRACTORY CYLINDERS IN CO$_2$

| Specimen | Duration of Exposure in Minutes | Weight Loss in gm. |
| --- | --- | --- |
| Untreated graphite | 90 | 7.4 |
| Graphite coated with SiC | 100 | 3.7 |
| Graphite coated with SiC and glazed | 120 | 0.0 |

Although the most satisfactory properties are obtained in the new refractory articles using frits of the composition of the foregoing example, the new procedures may be carried out with frits within the following ranges of composition:

FRIT "A"

Ingredient: Weight percentage
    Zinc oxide _____ 40–50
    Alumina _____ 10–15
    Silica _____ 40–50

FRIT "B"

Ingredient: Weight percentage
    Zinc oxide _____ 2–5
    Alumina _____ 2–5
    Lead oxide _____ 60–70
    Silica _____ 20–30

As a variation of the preferred procedure, it would be possible to form the protective outer layer of the new articles from a mixture of the oxides which comprise the glaze. However, it is better to use a mixture of frits as discussed because the original oxides require higher temperatures for fusion and involve more difficult control in firing. Use of the frit mixture also drives off occluded gases in the original oxides.

It has been found that by the use of two separate frits blended in selected proportions, a glaze may be applied with less tendency for absorption completely into the SiC layer. Thus, the proportion of frit A to frit B is chosen to control the absorption of the fused mixture into the carbide layer since frit A has been found to have less tendency to be absorbed than frit B. Usable frit mixtures may have a ratio of frit A to frit B of between about 1:6 and 1:12.

The frit composition used to produce the final glaze is usually in the form of an aqueous slurry of the powdered mixture of frits in water. Water-soluble additives, e.g., organic suspending agents like methyl cellulose and/ or water-insoluble inorganic plasticizers like bentonite and similar materials known to the ceramics art for use in the formation of slips may be included in suitable amount, e.g., up to 3% by weight, especially 0.1 to 2%.

The slurry may be applied by brushing, dipping, roller coating, spraying or other means. Standard available furnaces, ovens, mixers or other equipment employed in the ceramics art may be used to produce the new refractory articles.

The invention as described provides new, improved refractory structures having high resistance to thermal shock and practically all types of corrosion encountered by graphite in its use in industrial applications. The new structures are particularly useful in constructing parts of nuclear reactors because they have such a low capture cross-section for thermal neutrons.

Having provided a complete description of the invention in such manner as to distinguish it from other inventions and from what is old, and having provided a description of the best mode contemplated of carrying out the invention, the scope of patent protection to be granted the invention is defined by the following claims.

I claim:

1. A refractory article having a low capture cross-section for thermal neutrons which may be maintained in gaseous atmospheres that are normally corrosive to graphite without appreciable corrosion to the article which comprises:
   (A) base formed of graphite;
   (B) a coating consisting essentially of silicon carbide covering an outer surface of said graphite base; and
   (C) a protective glaze covering said silicon carbide coating consisting essentially of a fused mixture of zinc oxide, aluminum oxide, lead oxide and silica the proportions of the mixture being selected so that the coating will wet the silicon carbide without being completely absorbed by it.

2. An article as claimed in claim 1 wherein said fused mixture is between about 6 to 10% by weight zinc oxide, 2 to 6% by weight aluminum oxide, 25 to 30% by weight silica and 55 to 65% by weight lead oxide.

3. An article as claimed in claim 1 wherein said fused mixture is about 8% $ZnO$, 4% $Al_2O_3$, 28% $SiO_2$, and 60% $Pb_3O_4$.

4. A method of forming a protected graphite article having a low capture cross-section for thermal neutrons while being resistant to deterioration by atmospheres that are corrosive to graphite which comprises:
   (a) applying a thin layer of silicon carbide to an outer surface of a graphite article;
   (b) providing a first frit consisting essentially of zinc oxide, aluminum oxide, and silica;
   (c) providing a second frit consisting essentially of zinc oxide, aluminum oxide, lead oxide, and silica;
   (d) mixing a portion of said first frit with a portion of said second frit in predetermined proportions to provide a frit mixture of controlled absorption relative to said silicon carbide layer;
   (e) applying a coating of said frit mixture over said silicon carbide layer, and
   (f) firing the resulting structure to fuse said frit mixture and produce a graphite article which is impervious to gases normally corrosive to graphite.

5. A method of forming a protected graphite article having a low capture cross-section for thermal neutrons while being resistant to deterioration by atmospheres that are corrosive to graphite which comprises:
   (a) providing a graphite article having a thin layer of silicon carbide on its outer surface;
   (b) providing a frit composition comprising a mixture of between about 6 to 12 parts of a second frit for each part by weight of a first frit, said first frit consisting essentially of between about 40 to 50% by weight zinc oxide, 10 to 15% alumina and 40 to 50% silica and said second frit consisting essentially of between about 2 to 5% by weight zinc oxide, 60 to 70% lead oxide, 2 to 5% alumina and 20 to 30% silica;
   (c) applying a layer of said frit composition over the silicon carbide layer of said graphite article, and
   (d) firing the resulting structure at a temperature between about 1200 to 1300° C. to fuse said mixture to form a glaze on said article which is impervious to gases normally corrosive to graphite.

6. A method as claimed in claim 5 wherein said frit mixture consists of 1 part of said first frit and 9 parts by weight of said second frit.

7. A coating composition for forming a fused coating on a pervious silicon carbide surface comprising a mixture of a first frit and a second frit in a ratio of between about 1:6 and 1:12 in parts by weight, said first frit consisting essentially of the following ingredients in the indicated weight percentages:

| | Percent |
|---|---|
| Zinc oxide | 40–50 |
| Alumina | 10–15 |
| Silica | 40–50 | and said second frit similarly consisting essentially of:

| | |
|---|---|
| Zinc oxide | 2–5 |
| Alumina | 2–5 |
| Lead oxide | 60–70 |
| Silica | 20–30 |

8. A coating composition for forming a fused coating on a pervious silicon carbide surface comprising a mixture of a first frit and a second frit in a ratio of 1:9 in parts by weight, said first frit consisting essentially of the following ingredients in about the indicated weight percentages:

| | Percent |
|---|---|
| Zinc oxide | 45 |
| Alumina | 13 |
| Silica | 42 | and said second frit similarly consisting essentially of:

| | |
|---|---|
| Zinc oxide | 4 |
| Alumina | 3 |
| Lead oxide | 67 |
| Silica | 26 |

References Cited by the Examiner

UNITED STATES PATENTS

| | | | |
|---|---|---|---|
| 1,633,534 | 6/1927 | Long | 252—478 |
| 1,948,382 | 2/1934 | Johnson | 117—228 |
| 2,413,549 | 12/1946 | Deyrup | 106—53 |
| 2,425,032 | 8/1947 | Deyrup | 106—49 |
| 2,677,627 | 5/1954 | Montgomery et al. | 117—106 |

OTHER REFERENCES

Parmelee: Ceramic Glazes, 2nd ed., 1951, pp. 56, 62, 222 and 225, published by Industrial Publications, Inc.

Parmelee: Ceramic Glazes, 2nd ed., 1951, pp. 103–104, published by Industrial Publications, Inc.

RICHARD D. NEVIUS, *Primary Examiner.*

JOSEPH B. SPENCER, *Examiner.*